No. 847,942. PATENTED MAR. 19, 1907.
G. C. HOHEIN.
MEDICINE SPOON.
APPLICATION FILED JAN. 20, 1906.
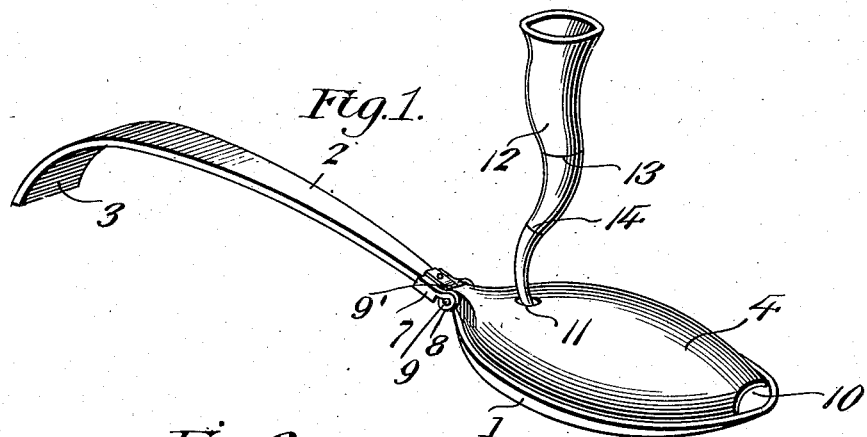
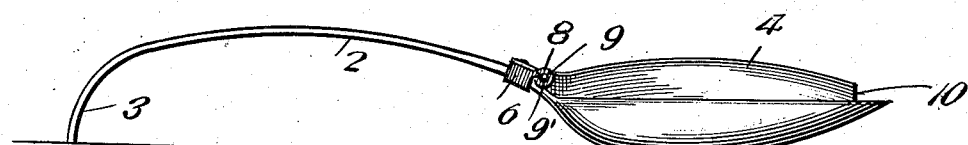
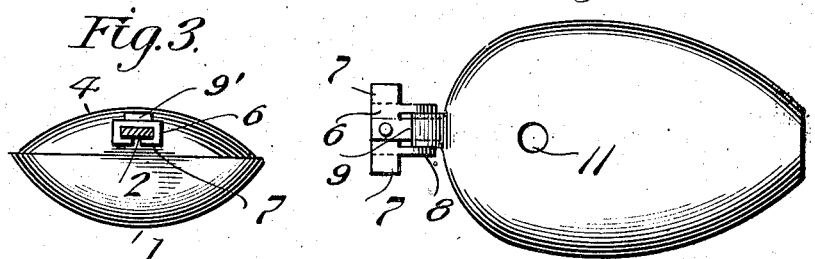
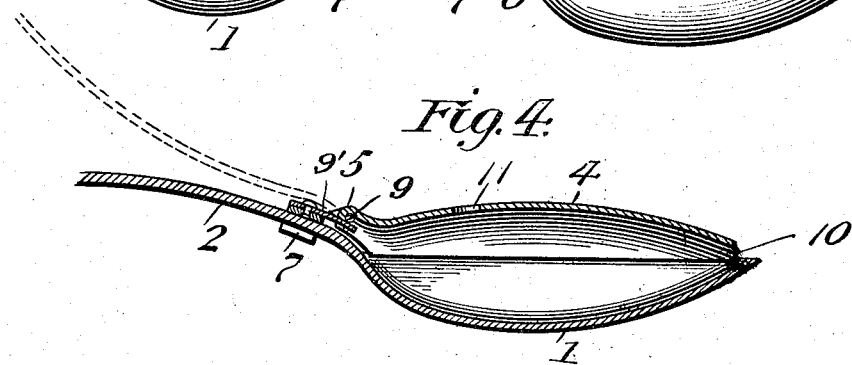
Inventor
Geo. C. Hohein
Witnesses
By Victor J. Evans
Attorney

UNITED STATES PATENT OFFICE.

GEORGE C. HOHEIN, OF NORFOLK, VIRGINIA.

MEDICINE-SPOON.

No. 847,942.     Specification of Letters Patent.     Patented March 19, 1907.

Application filed January 20, 1906. Serial No. 297,071.

*To all whom it may concern:*

Be it known that I, GEORGE C. HOHEIN, a citizen of the United States, residing at Norfolk, in the county of Norfolk and State of Virginia, have invented new and useful Improvements in Medicine-Spoons, of which the following is a specification.

This invention relates to medicine-spoons, the object of the invention being to provide an attachment applicable to an ordinary spoon which will convert said spoon into a practical, efficient, and convenient medicine-spoon, or, in other words, a spoon particularly adapted to administer medicine either in liquid or powdered form to a patient for securing the best results and where powder is employed for scattering the powder and reaching the diseased parts, as in cases of diphtheria and the like.

With the above and other objects in view, the nature of which will more fully appear as the invention proceeds, the invention consists in the novel construction, combination, and arrangements of parts hereinafter fully described, illustrated, and claimed.

In the accompanying drawings, Figure 1 is a perspective view of a spoon with the improved attachment applied thereto. Fig. 2 is a side elevation of the same. Fig. 3 is a cross-section through the spoon-handle, showing the manner in which the attachment is fastened thereto. Fig. 4 is a vertical longitudinal section through the spoon complete. Fig. 5 is a plan view of the attachment.

Like reference-numerals designate corresponding parts in all the figures of the drawings.

In the drawings I have shown an ordinary spoon comprising the usual bowl 1 and handle 2, the latter for the purposes of this invention being bent downward at its extremity to form a support or rest 3, which maintains the bowl of the spoon in position to receive medicine either in liquid or powdered form.

The attachment consists of a bowl-shaped cover or lid 4, which in its general shape resembles the bowl of the spoon and which is disposed reversely to the bowl of the spoon, as shown. The cover 4 is sufficiently smaller in size than the bowl 1 to have its marginal edge fit within the marginal edge of the bowl 1, so as to seat itself against the inner surface of the spoon-bowl, as shown in Figs. 1, 3, and 4, the cover 1 contacting throughout its marginal edge with the interior surface of the bowl 1.

At its inner end the cover or lid 4 is provided with a backwardly-extending tongue 5, which constitutes a pivot-lug and also a cam projection, the purpose of which will hereinafter appear. Connected pivotally to the tongue 5 is a metal strap or band 6, having the lateral projecting portions 7. This band is made of soft metal, so that the projecting end portions 7 thereof may be bent around the handle 2 of the spoon adjacent to the bowl in the manner shown in the drawings, and particularly Fig. 3, whereby the cover or lid 4 is securely fastened to the spoon. The strap or band 6 is provided with the forwardly-extending pivot-lugs 8, through which passes a pivot 9, which also extends through the tongue 5 and pivotally connects the parts 4 and 6, thus adapting the lid or cover to be swung upward and thrown open to give free access to the bowl of the spoon.

Connected to the center of the strap or band 6 is a spring 9', which lies beneath the extremity of the tongue 5, the relative disposition of the tongue and spring being such that the spring exerts its tension to hold the lid or cover closed, as shown in full lines in Fig. 4, or open, as shown in dotted lines in the same figure. The forward end or point of the cover 4 is cut away, as shown at 10, to form an outlet or discharge orifice, through which the medicine passes to the mouth of the patient.

The cover or lid 4 is also provided adjacent to its hinged end with small holes 11, in which is removably fitted the smaller extremity of a combined dropper and blower 12, the opposite or outer end of the blower being considerably enlarged to enable the point of the spoon to be inserted therein in delivering the contents of the spoon into the combined dropper and blower. The combined dropper and blower is preferably of sectional form or consists of a plurality of sections fitting or telescoping one within the other at the points 13 and 14, thus enabling the combined dropper and blower to be taken to pieces and the parts thereof kept clean and in a sanitary condition.

The medicine may be mixed in the spoon and then poured into the dropper or blower, or the combined dropper and blower may be inserted in the hole in the cover and used for forcing the medicine from the spoon into the mouth of the patient. When the blower is used in connection with the covered spoon, the medicine is sprayed outward through the discharge-orifice of the spoon and thoroughly scattered, so as to reach all parts of the mouth and throat of the patient. The hole 11 when the combined dropper and blower is removed acts as an air-inlet and facilitates the flowing of thick liquid from the discharge-orifice of the spoon. It will also be noted that by reason of the cover or lid being smaller than the bowl of the spoon the constant opening and closing of said cover or lid will not abrade or injure the marginal edge of the spoon, which is left thus perfectly smooth and always fit for use. Furthermore, by making the device in the form of an attachment to an ordinary spoon the cost of manufacture of the complete spoon is materially reduced.

Having thus described the invention, I claim—

1. An attachment for a spoon embodying a bowl-shaped cover or lid having the point or end thereof notched to form an outlet or discharge orifice, and an attaching strap or band of soft metal having pivotal connection with the inner end of said cover and adapted to be bent around the handle of an ordinary spoon.

2. An attachment for a spoon embodying a cover or lid, and an attaching strap or band of soft metal having pivotal connection with the cover or lid and adapted to be bent around the handle of an ordinary spoon.

3. An attachment for spoons comprising a cover or lid, a soft-metal band or strap having said cover pivotally connected thereto, said attaching device being adapted to embrace the handle of a spoon to hold the cover connected therewith, a tongue on said cover, and a spring carried by the attaching device with which said tongue engages.

4. An attachment for spoons comprising a cover or lid, and an attaching device therefor consisting of a soft-metal strap adapted to be bent around the handle of the spoon, the cover being pivotally connected to said attaching device and the bowl being provided with a blower-hole.

In testimony whereof I affix my signature in presence of two witnesses.

GEORGE C. HOHEIN.

Witnesses:
 P. B. WILLIAMS,
 F. M. SMITH.